UNITED STATES PATENT OFFICE.

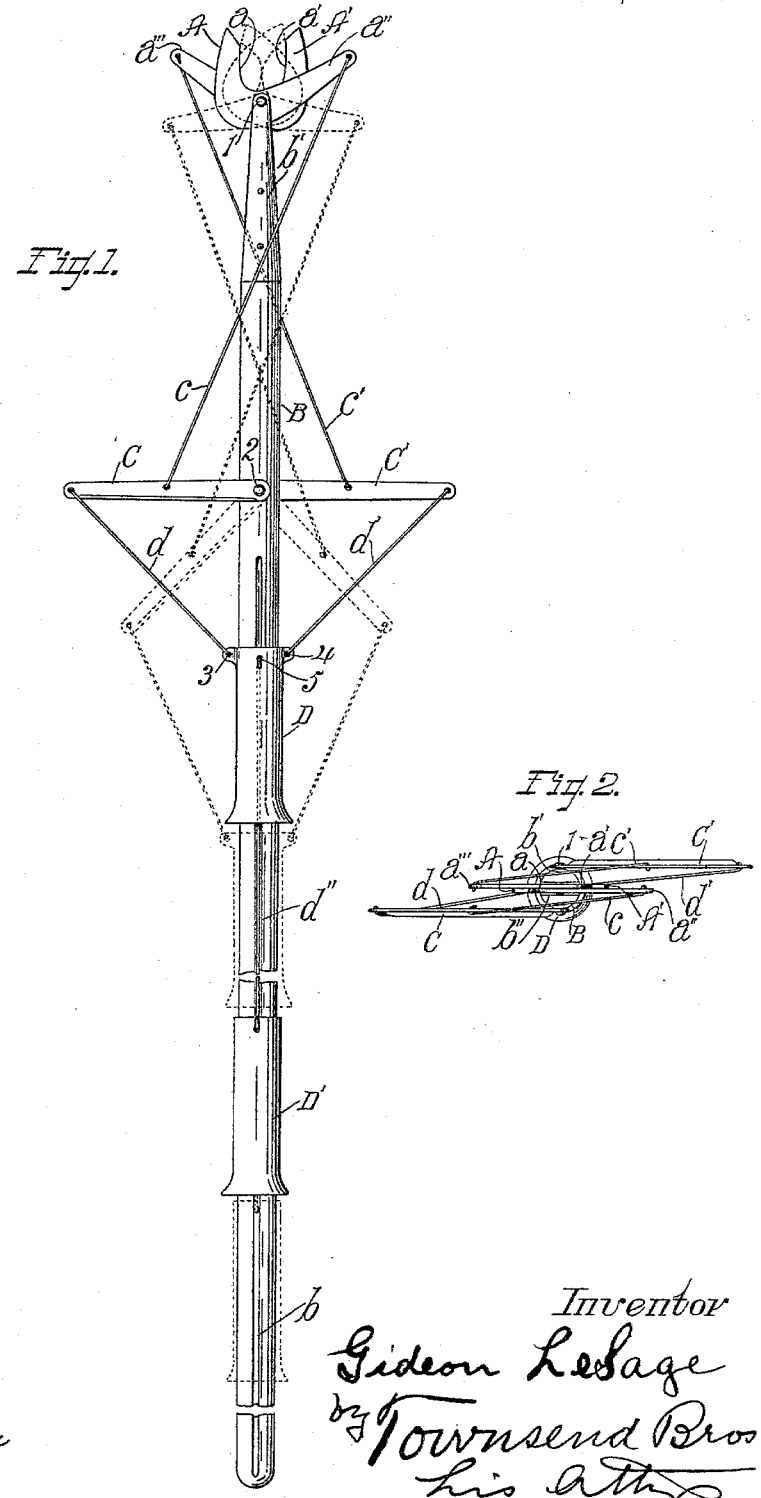

GIDEON LE SAGE, OF LOS ANGELES, CALIFORNIA.

PRUNING IMPLEMENT.

SPECIFICATION forming part of Letters Patent No. 596,890, dated January 4, 1898.

Application filed April 24, 1897. Serial No. 633,819. (No model.)

*To all whom it may concern:*

Be it known that I, GIDEON LE SAGE, a citizen of the United States, residing at Los Angeles, in the county of Los Angeles and State of California, have invented new and useful Improvements in Pruning Implements, of which the following is a specification.

My invention relates to the peculiar form of the cutting-blades and also to the combinations and parts hereinafter described and claimed.

The object is to afford greater ease and convenience for cutting the larger as well as the smaller limbs.

The accompanying drawings illustrate my invention.

Figure 1 is a side elevation of my newly-invented implement. Solid lines show the parts in the open position and dotted lines show them in the closed position. Fig. 2 is a plan of the implement.

A A' indicate the cutting blades or knives, pivoted at 1 to the main handle B. These knives are of an elbow or U shape, and the pivot 1 passes through the blades at the elbows or bends thereof, the edge $a$ $a'$ of each being bent so that when the blades are open, as indicated in solid lines in Fig. 1, the two edges form opposite sides of a U, and the shanks $a''$ $a'''$ of the blades or knives, respectively, project upward and outward from the pivot 1.

C C' indicate two levers respectively connected by connecting-rods $c$ $c'$ with the shanks $a''$ $a'''$ of the blades A and A', respectively. The levers C and C' are pivoted to the handle B by the pivot 2 and are arranged to project at right angles substantially with the handle B when the blades A A' are open. The connecting-rods $c$ $c'$ cross the plane of the handle between their levers and their knife-shanks, respectively, and connect the levers with the oppositely-disposed shanks of the blades, so that the downward movement of the levers will close the blades, and vice versa.

D is a suitable slide or sleeve arranged to slide upon the handle B and connected with the levers C C' by connecting-rods $d$ $d'$, so that when the sliding handle D is drawn downward the blades will be drawn together. The sliding handle D is placed a short distance below the levers C C', and a sliding handle D' is provided at the lower end of the handle B to slide therealong. This lower sliding handle D' is connected with the upper sliding handle D by connecting-rods $d''$, so that the appliance can be operated by the hand of the operator close to the end of the handle of the implement or close to the levers C and C'. Thus they may be used at greater or less heights.

$b$ indicates a groove in the handle B to chamber the connecting-rods $d''$, which connect the handles D and D'. One of these rods and grooves is provided on each side of the appliance, so that draft upon the handles will be balanced. The groove $b$ seats the connecting-rod $d''$ sufficiently to allow the same to be slid up and down in the groove while the operator is holding the handle in his hand, with the hand grasping the handle around the grooved portion.

The sliding handles D and D' are preferably tubular and flare at the lower end to afford a good handhold. $b'$ indicates a ferrule at the upper end of the handle. This ferrule is slotted, as at $b''$, and the U-shaped knives fit in the slot, where they are fastened by the pivot.

In practical operation the implement is brought into position so that the limb to be cut enters the U-shaped opening between the blades and one or the other of the handles D D' is pulled down, thus to forcibly draw the edges of the blades toward each other. The edges of the blades clasp the limb and prevent any danger of its slipping out from between the blades until cut.

The upper sleeve D is provided with outwardly-projecting ears 3 4, into which the rods $d$ $d'$ are fastened, and with holes 5 for the ends of the rods $d''$ virtually in the same horizontal plane with the ears, so that the draft will not cause the sleeve to bind on the main handle.

Now, having described my invention, what I claim as new, and desire to secure by Letters Patent, is—

1. The combination of the handle; the U-shaped blades pivoted to the end thereof by a pivot which passes through the elbows of the blades, said blades being arranged with their edges to form a U-shaped opening when they are apart; two levers pivoted to the handle;